May 28, 1935. E. T. BRACE 2,002,880
HUMIDIFIER
Filed April 15, 1932 5 Sheets-Sheet 1

INVENTOR
EDWIN T. BRACE,
BY
ATTORNEYS

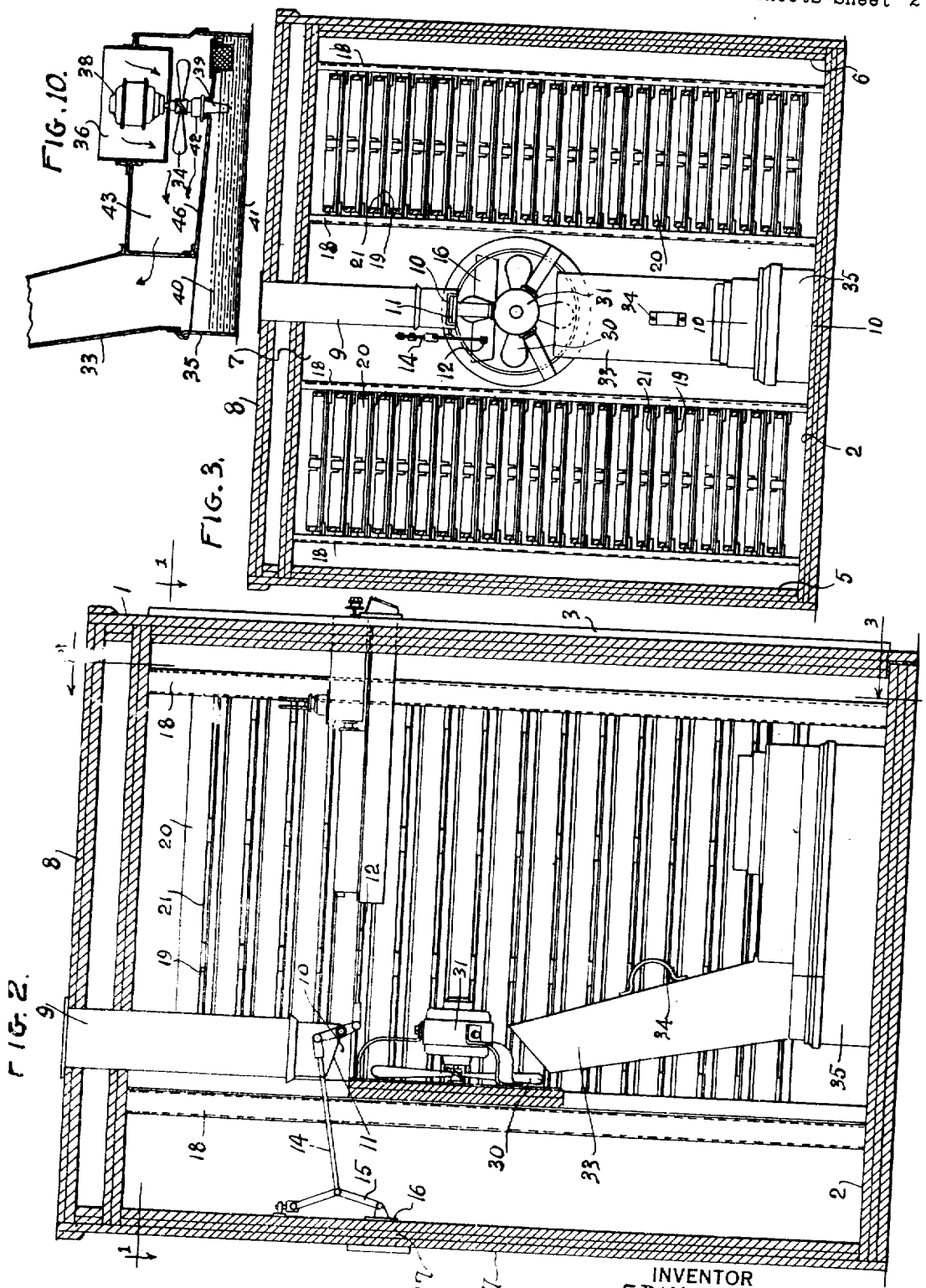

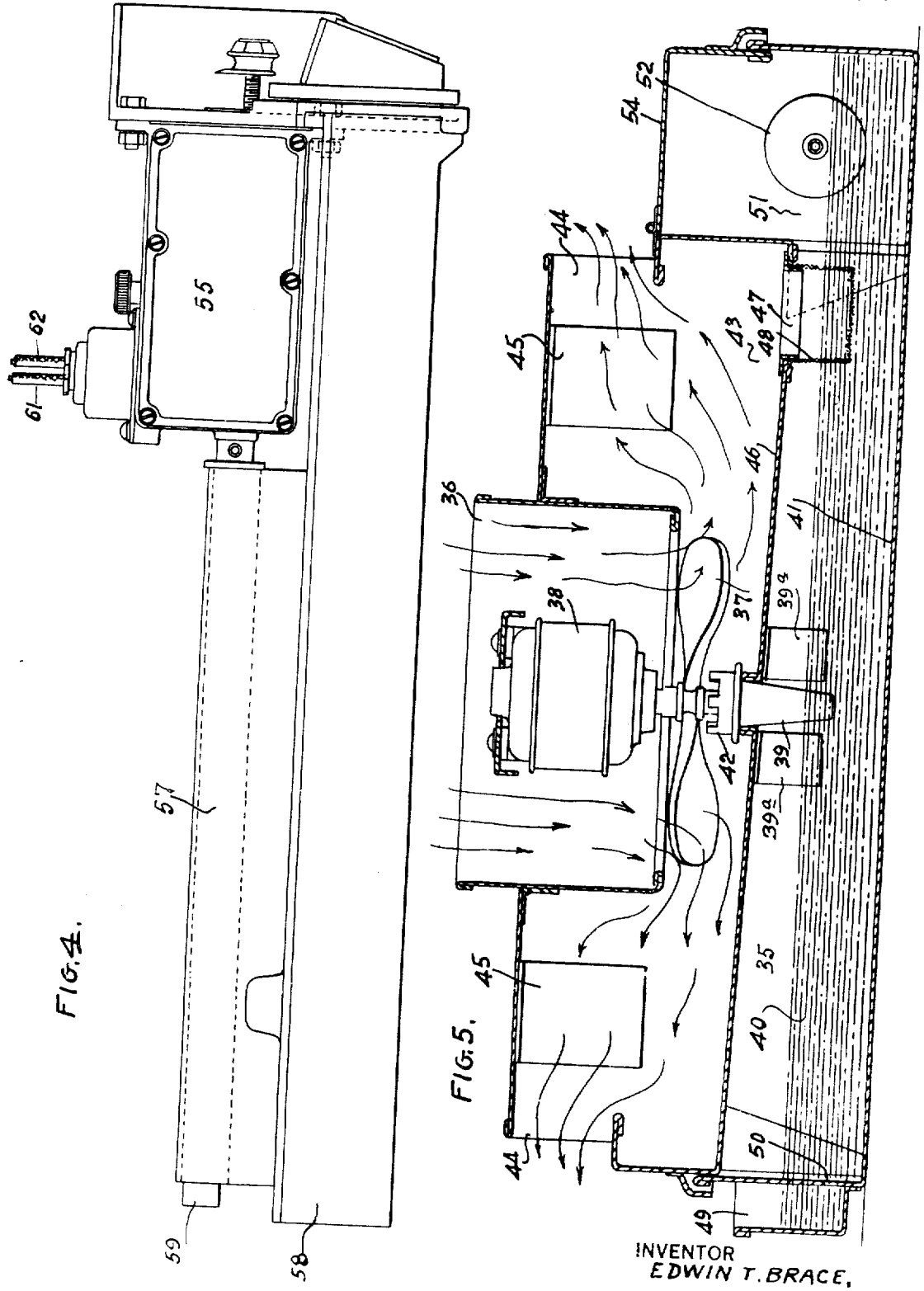

May 28, 1935.　　　　　E. T. BRACE　　　　2,002,880
HUMIDIFIER
Filed April 15, 1932　　　5 Sheets-Sheet 4

INVENTOR
EDWIN T. BRACE,
BY
ATTORNEYS

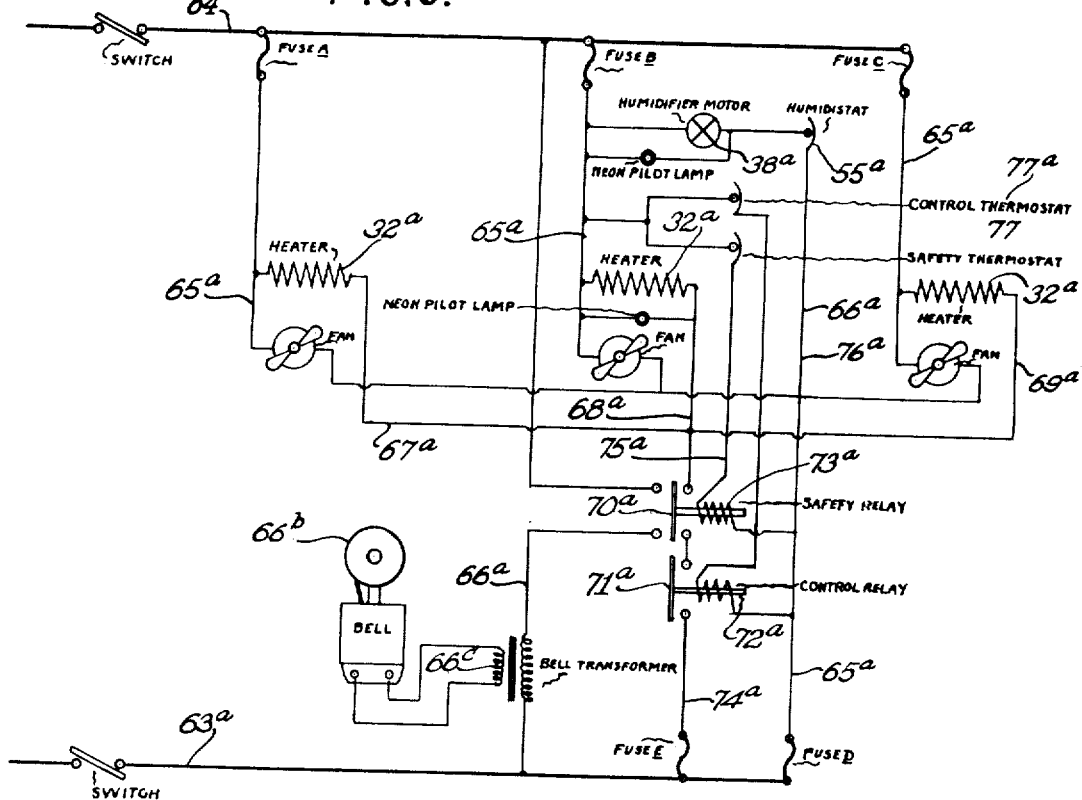
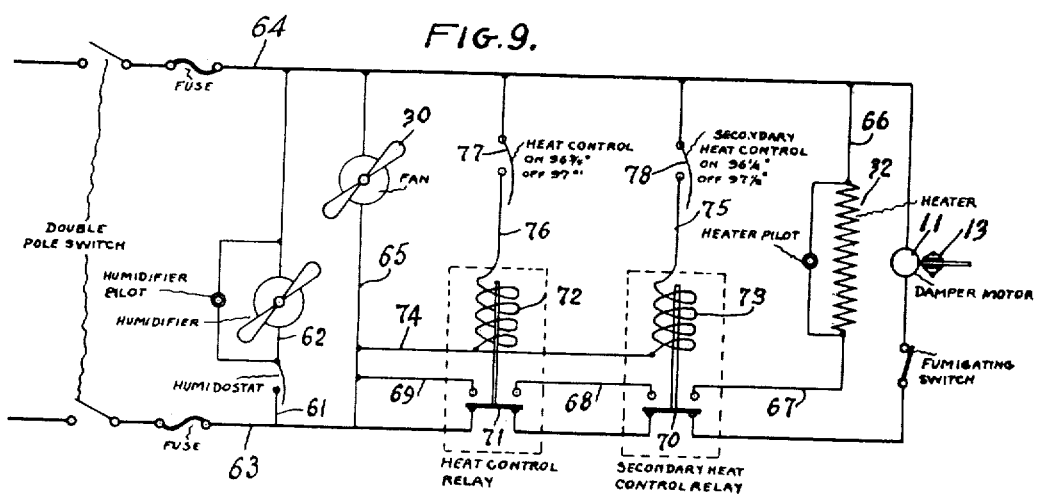

Patented May 28, 1935

2,002,880

UNITED STATES PATENT OFFICE 2,002,880

HUMIDIFIER

Edwin T. Brace, Springfield, Ohio, assignor to The Buckeye Incubator Manufacturing Company, Springfield, Ohio, a corporation of Ohio Application April 15, 1932, Serial No. 605,476

5 Claims. (Cl. 261—91)

My invention relates to incubators and hatchers and in particular to that feature dealing with the control of moisture in the incubator.

In particular it is my object to provide a novel form of humidifier and novel means of applying the humidified air to the main air stream as well as extracting a portion therefrom, humidifying it and returning it to the main air stream.

It is a further object to provide means of circulating air in the enclosure with respect to the humidifier in order to thoroughly distribute the humidified air so that there will be uniformity of application of the moisture to all parts of an enclosure.

It is my object to provide means of distributing humidified air in its humidified condition, to humidify the air at each circuit and to apply the same degree of humidity to each layer of eggs.

Figure 2 is a section on the line 2—2 of Figure 1.

Figure 3 is a section on the line 3—3 of Figure 2.

Figure 4 is a side elevation of the humidifier control.

Figure 5 is a vertical section through the humidifier.

Figure 8 is a wiring diagram showing the humidifier, heat and fan controls.

Figure 9 is a view showing a preferred form of the electric circuit controlling the humidifier, the fans, the heat and the admission of fresh air to the enclosure.

Figure 10 is a section on the line 10—10 of Figure 3.

Figure 1:
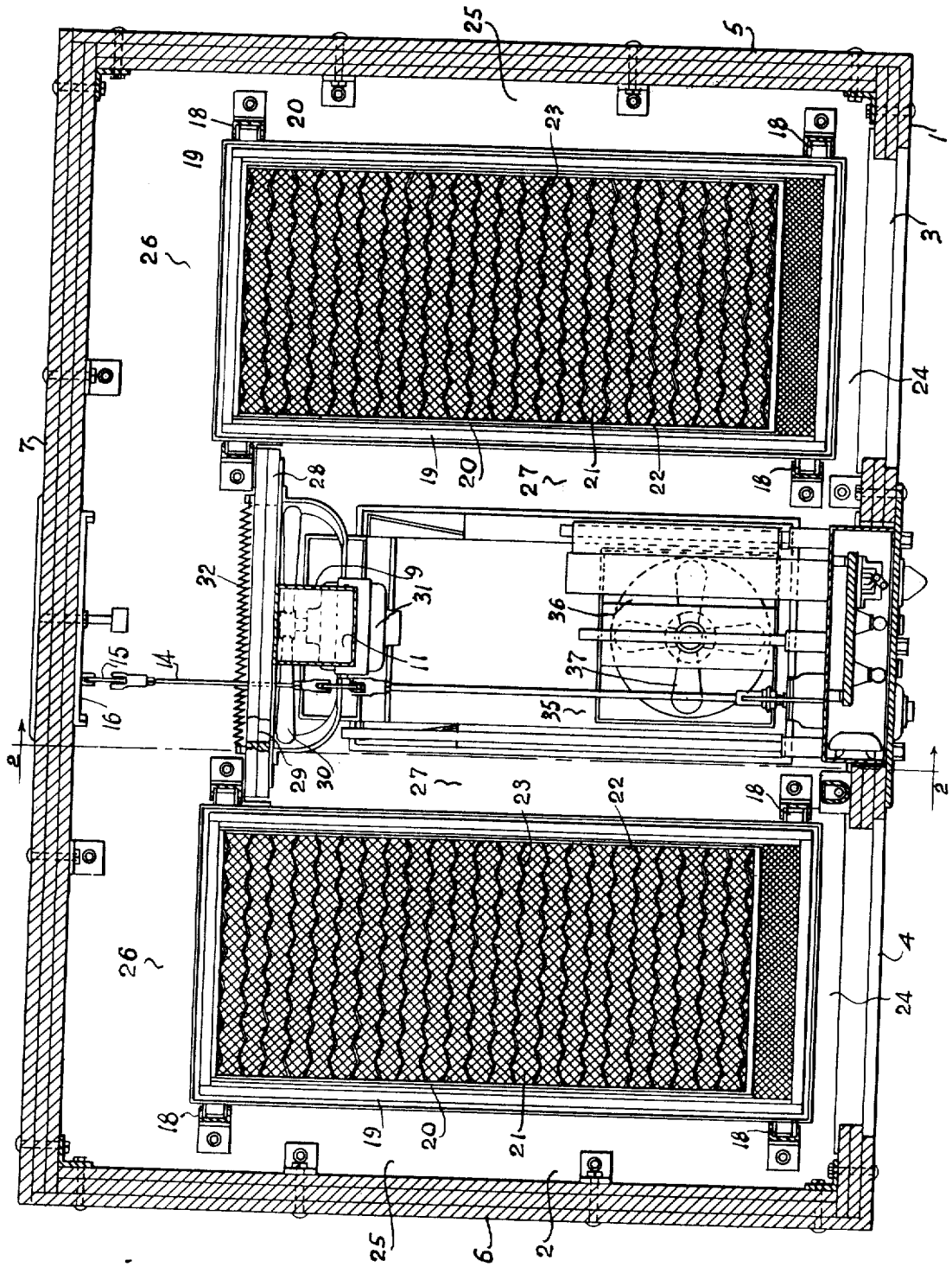
Figure 1 is a section on the line 1—1 of Figure 2.

Referring to the drawings in detail, 1 represents the front of an incubator having a bottom 2 and front doors 3 and 4. 5 and 6 indicate the side walls and 7 the back while 8 designates the top. The top is provided with an air inlet chute 9 discharging at 10 and provided with a damper 11. This damper is operated by the pitman 12 which in turn is operated by a motor 13.

The damper 11 is connected to the pitman 14 which in turn is connected to the links 15 that operate the air exit damper or exhaust 16 controlling the port 17.

The interior of the enclosure is provided with spaced uprights 18 carrying spaced solid bottom trays 19 carrying egg trays 20 having wire mesh bottoms 21. Within these trays reciprocate smaller frames 22 having transverse egg turning members 23. The forward ends of the stacks of trays are adjacent the doors 3 and 4, while the rear ends are spaced a greater distance from the back 7 of the enclosure. There is a passageway, however, all the way around the stacks of trays as in front at 24, on the outside at 25, the back at 26 and between the trays at 27. A fan plate or housing 28 is vertically disposed between the rear ends of the trays, this plate having an aperture 29 through which the fan 30 blows air from the space 27 to the space 26, the air travelling in a horizontal path so that it will circulate between the egg trays as the trays are embraced on either side by the solid bottom parts or trays 19, so that the air must circulate over the eggs in each tray independently of any other eggs in any other tray. The fan 30 is driven by a suitable motor 31.

It will be understood that there may be a plurality of these fans and a plurality of these motors as indicated in Figure 8. Across the face of the fan are electric resistance heating wires 32.

Discharging into the inlet side of the fan is a chute 33 carrying a handle 34 which communicates with the humidifier pan 35.

Figure 7:
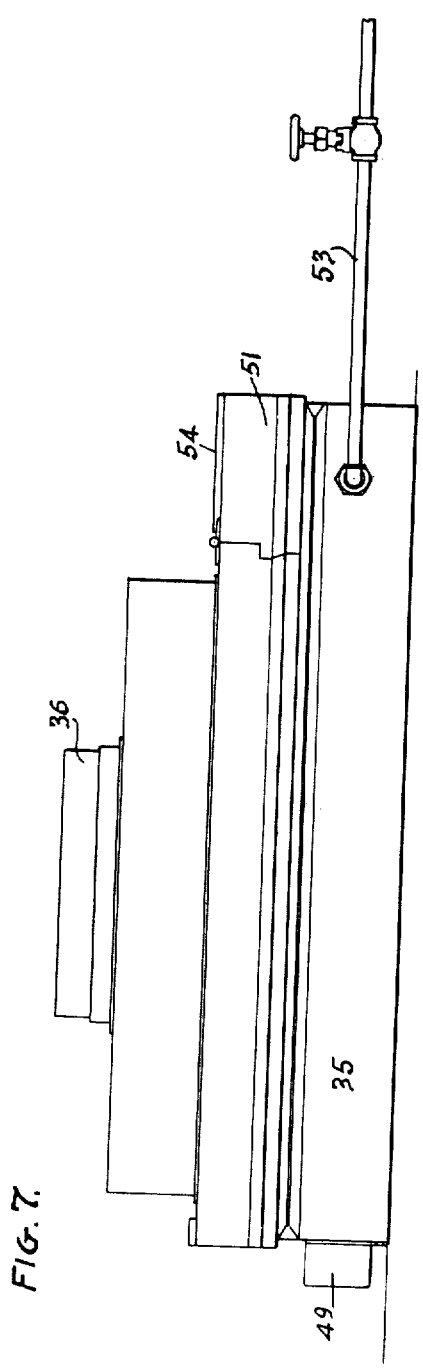
Figure 7 is a detailed side elevation of the humidifier.

Referring to the preferred form shown in Figures 5 and 7, the humidifier pan 35 is provided with an air inlet tube 36. The air is induced to enter by the fan 37 operated by the motor 38.

This fan operates the pump 39, one end of which projects into the water 40 in the water pan 41 and the other end of which is provided with a spray distributor 42 which delivers a spray into an air chamber 43, whence the air makes its exit through the exit ports 44 around the baffles 45 or the air may be discharged through the chute 33 if that is employed.

It will be noted that the floor of the space 43 is designated 46 and is inclined to a sump 47 having a wire bottom 48. This sump is removable. The forward end of the water pan 41 is provided with a filler cup 49 communicating through the port 50 with the water pan 41, the rear end of which communicates with a float chamber 51 which has a float 52 controlling the introduction of water in the usual manner from a pipe line 53. The float chamber is provided with a hinged cover 54. Associated with the water motor or pump 39 are baffles 39a depending from the bottom 46 of the chamber 43.

The dry air laden with fluff from the chicks or other foreign material is drawn in through the casing 36 which forms a motor housing and motor support. This air is discharged into the water spray. The water and fluff run downhill on the sloping bottom 46 to the sump strainer 47 where the fluff is maintained in a wet condition at all times so that it will not be taken up by the air stream. The dry air having deposited its burden by turning at right angles and slowing down, at the same time secures its load of moisture, passes over the baffles 45 and out the port 44 into the horizontally circulating air stream.

In the modified form shown in Figure 10 the air leaving the port 44 at one end is discharged through the vertical chute 33.

Figure 6:
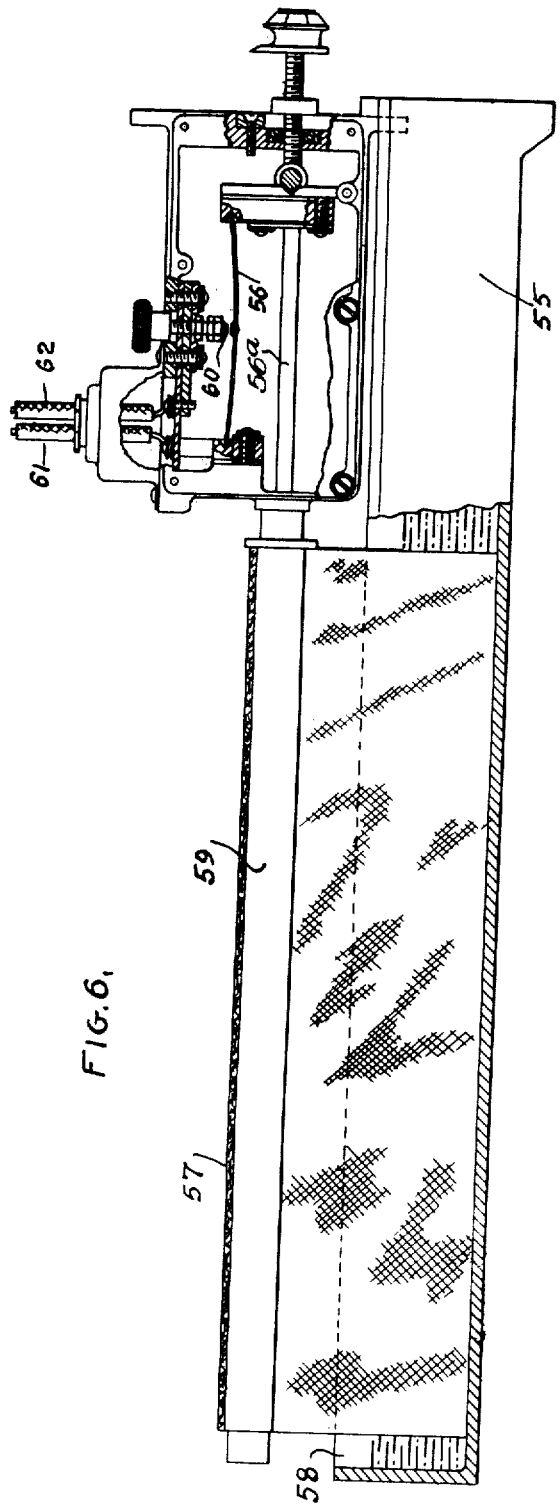
Figure 6 is a side elevation partially in section of the humidifier control.

The starting and stopping of the motor fan 37 is controlled by means of a humidostat 55, shown in Figures 4 and 6. This humidostat has a resilient contact member 56 pivotally supported at each end. The support at one end of the member 56 is attached to one end of a rod 56a, which has its other end connected to one end of a sleeve 59. Over this sleeve is a wick 57 which dips into a trough 58 located below the sleeve 59.

The condition of the atmosphere about the wick and the sleeve will cause a change in the condition of the rod 56a, which change transmits a movement to the support for the righthand end of the member 56, as shown in Figure 6. When this support moves to the right the member 56 stretches and forms a contact for closing an electric circuit. This contact is formed by means of two contacts 60, which control a circuit comprising two wires 61 and 62. When the support for the righthand end of the member 56 is moved toward the left, as shown in Figure 6, the member 56 is caused to bend downward, thereby breaking the contact between the contact members 60.

The wires 61 and 62 are connected in circuit to the main supply lines 63 and 64. Across these lines is the fan circuit 65 containing a fan 30. The heat circuit 66 containing the heater 32 is connected from the main circuit 64 to the fan circuit 65 through the wires 67, 68 and 69. These wires are bridged by the cross-over switches 70 and 71 operated by the respective coils 73 and 72. One end of each of these coils is connected to the fan circuit by the wire 74. The other ends of the coils are respectively connected by the wires 76 and 75 through the primary thermostat 77 and the secondary thermostat 78 respectively to the wire 64.

In operation, the heat is cut on and off by the primary thermostat 77 and maintained between the ranges of 96¾° and 97°. If the heat rises above 97°, the heating circuit is cut off by the movement of the cross-over switch 71 from the wires 68 and 69 to the terminals in the wires 63 just below.

If the heat continues to rise due to the animal heat in the incubator, the secondary thermostat will open at 97½°, closing the circuit 63 by the cross-over switch 70, thereby energizing the damper motor to open the damper and admit fresh air. Whether the heat circuit is operating or the fresh air circuit is operating makes no difference to the humidostat, which will open and close according to the moisture content within the cabinet. The fan 30 also continues to operate continuously.

In Figure 8 the supply lines are indicated by the numerals 63a and 64a. Connected across these supply lines are fan circuits 65a. The heaters 32a are in circuits 67a, 68a, 69a and 74a. The part 74a is common to the parts 67a, 68a and 69a. These circuits are controlled by means of switches 70a and 71a, operated by thermostats. The switch 70a is a safety relay switch operated by a relay 73a in a circuit 75a adapted to be closed or opened by means of a safety thermostat 78a. The switch 71a is operated by a control relay 72a in a circuit 76a adapted to be opened or closed by means of a safety thermostat 77a.

The motor 38a is in the circuit 65a adapted to be opened or closed by means of a humidostat 55a. The switch 70a is adapted to close a circuit 66a connecting the two main supply lines. Connected to this circuit is a transformer 66c for operating a bell 66b. This bell only operates when the switch 70a closes the circuit 66a. This is done when the heat has reached an excessive point for the purpose of giving a sound signal to indicate a dangerous heat condition.

I desire to comprehend within my invention such modifications as may be clearly embraced within the claims and scope of my invention.

Having thus fully described my invention, what I claim as new and desire to secure by Letters Patent, is:

1. In a humidifier, a water pan having at one end an air outlet chute, an inclosure forming an air chamber extending from the chute to the other end of the pan, said chamber having a bottom with an opening therein forming the top of the pan, an inlet tube intermediate the ends of the air chamber, means to take air into the chamber through the tube and force it out at the chute, and means to take water from the pan through the opening and spray it into the air.

2. In a humidifier, a water pan having at one end an air outlet chute, an inclosure forming an air chamber extending from the chute to the other end of the pan, said chamber having a bottom with an opening therein forming the top of the pan, an inlet tube having one end extending into the air chamber over the opening, a motor in the tube having a shaft extending through the opening into the pan, means on the shaft to take air in through the tube and force it out through the chute, and means on the shaft to take water from the pan and spray it into the air in the chamber.

3. In combination, a tank, an air chamber having an air inlet passage at the top and a laterally-disposed air outlet passage, a fan arranged to force a stream of air downwardly into said air chamber, means to lift water and discharge it laterally into said chamber across the path of said air, said air chamber having a sloping bottom constituting a drain member inclined across said air chamber for receiving and conveying the solid particles deposited by the incoming air after said particles have been wet by the water spray, and a container disposed at the lowest point of said drain member, said container being adapted to maintain said particles in a submerged condition yet to debar them from returning to the tank, whereby to prevent said particles from drying and re-entering the air stream and also from clogging the water supply to said lifting means.

4. In combination, a tank, an air chamber having an air inlet passage at the top and a laterally-disposed air outlet passage, a fan arranged to force a stream of air downwardly into said air chamber, means to lift water and discharge it laterally into said chamber across the path of said air, said air chamber having a sloping bottom constituting a drain member inclined across said air chamber for receiving and conveying the solid particles deposited by the incoming air after said particles have been wet by the water spray, and a container disposed at the lowest point of said drain member, said container being adapted to maintain said particles in a submerged condition yet to debar them from returning to the tank, said container being arranged to return the water to the tank but to prevent the return of the solid particles thereto, whereby to prevent said particles from drying and re-entering the air stream and also from clogging the water supply to said lifting means.

5. In a humidifier, a casing, a water chamber, a superimposed air chamber, an air inlet tube extending into the air chamber, a motor, a fan adjacent to the inner end of said air inlet tube and driven by said motor, a pump communicating with the water chamber for delivering a water spray into the air chamber across the air coming out of the air inlet tube, said air chamber having a sloping bottom constituting a drain member inclined across said air chamber for receiving and conveying the solid particles deposited by the incoming air after the said particles have been wet by the water spray, and a container disposed at the lowest point of said drain member, said container being adapted to maintain said particles in a submerged condition yet to debar them from returning to the tank, whereby to prevent said particles from drying and re-entering the air stream and also from clogging the water supply to said pump.

EDWIN T. BRACE.